United States Patent

Thurm et al.

[11] Patent Number: 5,102,740
[45] Date of Patent: Apr. 7, 1992

[54] SYNTHETIC RESIN BODIES WITH IMPROVED RESISTANCE TO WEATHERING

[75] Inventors: Siegfried Thurm, Meerbusch; Kurt-Rainer Stahlke, Kuerten; Reimer Holm, Bergisch Gladbach; Klaus Sommer, Cologne, all of Fed. Rep. of Germany

[73] Assignee: Bayer Aktiengesellschaft, Leverkusen-Bayerwerk, Fed. Rep. of Germany

[21] Appl. No.: 633,002

[22] Filed: Dec. 24, 1990

[51] Int. Cl.⁵ .................. B32B 27/36; B32B 27/06; B05D 1/00

[52] U.S. Cl. .................. 428/412; 428/419; 428/704; 427/34; 427/35

[58] Field of Search .................. 428/412, 419, 704

[56] References Cited

U.S. PATENT DOCUMENTS 4,728,561  3/1988  Crocker .................. 428/419

Primary Examiner—P. C. Sluby
Attorney, Agent, or Firm—Connolly & Hutz

[57] ABSTRACT

This invention relates to synthetic resin bodies of thermoplastic polyarylene sulphides and/or of thermoplastic polycarbonates coated with zinc sulphide (ZnS).

1 Claim, No Drawings

SYNTHETIC RESIN BODIES WITH IMPROVED RESISTANCE TO WEATHERING

This invention relates to synthetic resin bodies of thermoplastic polyarylene sulphides and/or of thermoplastic polycarbonates coated with zinc sulphide (ZnS).

The synthetic resin bodies according to the invention have good resistance to the influences of the external atmosphere, in particular to light (e.g. sunlight or daylight). They retain their properties as synthetic resins over a long period of time, for example their mechanical and optical properties.

Layers containing ZnS are known. e.g. as heat insulating layers (JA-A 59 071 854, EP-A 50 199, DE-A 3 329 504), interference layers (DE-A 3 302 827), electroluminescence layers (EP-A 249 942, JA-A 7 238 308, FR-A 2 420 270), heat insulating or protective layers in optical storage systems (JA-A 63 020 742, JA-A 63 102 049 and JA-A 63 302 447) and photoconductive layers in electrophotographic copying apparatus (JA-A 62 011 857, JA-A 79 016 399, JA-A 54 143 646 and U.S. Pat. No. 4 269 912).

The present invention relates to shaped bodies of polyarylene sulphides and /or polycarbonates having the surfaces coated with zinc sulphide.

Polyarylene sulphides suitable for the preparation of the moulded articles according to the invention are known, in particular polyphenylene sulphide (e.g. U.S. Pat. No. 3 354 129 and EP-A 171 021).

Thermoplastic polycarbonates suitable for the preparation of the moulded articles according to the invention are known and commercially available.

The coating of moulded synthetic resin articles with ZnS (zinc sulphide) is carried out in a known vacuum vapour installation in which the moulded articles are fixed to a substrate support. The process is carried out in a vacuum of about $1 \times 10^{-5}$ mbar. The ZnS is evaporated by means of an electron beam gun. A movable screen is arranged between the electron beam gun and the fixed moulded article to prevent premature evaporation of the synthetic resin article during the heating up phase of the ZnS.

Evaporation of ZnS takes place at temperatures from about 1500° K. to 3000° K.

Before the protective film is applied by vapour deposition, the substrate may be subjected to a low pressure plasma treatment in a gas atmosphere, for example argon or $O_2$, at a pressure of about $5 \times 10^{-2}$ for the purpose of removing any impurities present on the substrate and thereby improving the adherence of the protective layer to the substrate.

The ZnS is at first heated by the electron beam gun with a heating power of 1-2 kW to raise its temperature to about 1500° to 3000° K. The pivotally mounted screen between the synthetic resin body and the electron beam gun is then removed and coating of the synthetic resin body is started.

During the process of vapour deposition, the thickness of the protective layer may be controlled, for example by means of a piezo-electric quartz instrument for measuring the thickness of layers. The stoichiometric composition of the protective layer may be influenced by the addition of reactive gases, e.g. $H_2S$. The term "ZnS layer" used hereinafter is therefore understood to denote a layer in which the ratio of the number of Zn atoms to the number of sulphur atoms is from 1 to 2.

The thickness of the ZnS layer may be from 40 to 4000 nm and is preferably from 50 to 2000 nm.

When a ZnS layer of sufficient thickness has been deposited on the synthetic resin body, for example a layer of 500 nm, the pivotally mounted screen is reintroduced between the substrate support and the electron beam gun and the latter is switched off. For obtaining a more uniform thickness of ZnS layer, it is advisable to use a movable, e.g. rotatable, substrate support.

The ZnS-containing layer could also be applied to the synthetic resin bodies by some other procedure, for example by evaporating the Zn alone or a mixture of Zn and ZnS in an atmosphere containing sulphur, using an electron beam gun or a resistance heated or inductively heated evaporator for the evaporation.

The ZnS-containing layer may also be applied by so-called direct voltage or high frequency sputtering of ZnS or by reactive direct voltage or high frequency sputtering of Zn.

Another method of applying the ZnS-containing layer to the synthetic resin body is the so-called "plasma supported" coating process in which the synthetic resin body is placed in a high frequency or microwave plasma and the ZnS is produced from a degradable metal compound and an S-containing gas, e.g. $H_2S$.

The degradable metal compound may be, for example, an organic zinc compound such as $Zn(C_2H_5)_2$.

Another method of applying the ZnS-containing layer consists of lacquering the synthetic resin body with a lacquer containing ZnS.

According to the invention, the synthetic resin bodies may have any form. They are particularly suitable for electronic parts and parts for the motor vehicle industry, domestic implements and lighting equipment.

EXAMPLE

A ZnS layer 500 nm in thickness is applied as follows to a plate of polyarylene sulphide (e.g. polyphenylene sulphide such as TEDUR(R)) (diameter 80 mm. thickness 3 mm) with the addition of 30% by weight of talc and 30% by weight of glass fibres: The moulded body is fixed to a rotatable substrate support in a vapour deposition installation, Model A1100 of Leybold-Heraeus GmbH. The chamber of the vapour deposition installation is then closed and evacuated to about $1 \times 10^{-5}$ mbar. Ar is then introduced until the pressure has been raised to $5 \times 10^{-2}$ mbar and the rotary drive for the substrate support is switched on so that the support rotates at 20 revs/min. A voltage of 600 V is then applied to an aluminium plate connected as cathode and a low pressure plasma is ignited. The moulded body is treated in this plasma at a power of 15 W for 2 minutes. The voltage is then switched off, the addition of Ar is terminated and the vessel is again evacuated to $1 \times 10^{-5}$ mbar.

When this pressure has been reached, the electron beam gun is switched on and the ZnS to be evaporated is heated to about 2500° K. within 2 minutes by means of a power of 1.6 kW. The movable screen between the electron beam gun and the substrate support is then removed and the moulded body is coated for 200 seconds at a rate of vapour deposition of 2.5 nm/sec. The movable shutter is then reintroduced between the electron beam gun and the substrate support and the coating process is terminated. 15 Minutes after the electron beam gun has been switched off and the deposited substance has cooled down, the chamber of the vapour deposition installation is ventilated and the coated body is removed.

The polyarylene sulphide moulded body coated as described above is now exposed to a Xenon UV lamp (1600 W XBO) at a distance of 31 cm behind a 305 nm edge filter together with an uncoated moulded body.

The samples are removed at intervals of 20 hours and the remission spectra are measured with a spherical geometry in the wavelength region of from 400 nm to 700 nm and the yellowness index (Y.I.) is then determined according to ASTM D 1925.

The change with time $\Delta Y.I.$ is calculated from the difference between the value obtained and the initial value. The accompanying graph shows the variation of $\Delta Y.I.$ of the coated sample (79/1) and the uncoated sample (79/2). It clearly shows that the coated sample undergoes yellowing much more slowly.

We claim:

1. An article of manufacture which comprises a molded synthetic resin body of polyarylene sulfide or polycarbonate, which is coated with a coating layer containing zinc sulfide.

* * * * *